United States Patent [19]
Hsu

[11] Patent Number: 5,740,971
[45] Date of Patent: Apr. 21, 1998

[54] APPARATUS FOR RECYCLING SYNTHETIC LEATHER

[76] Inventor: Wu-Heng Hsu, P.O. Box 82-144, Taipei, Taiwan

[21] Appl. No.: 560,548

[22] Filed: Nov. 17, 1995

[51] Int. Cl.⁶ .......................... B02C 19/12; B02C 23/08
[52] U.S. Cl. ................. 241/56; 241/79.1; 241/152.2; 241/162
[58] Field of Search ................. 241/46.17, 50, 241/56, 79.1, 152.2, DIG. 38, 157, 162

[56] References Cited

U.S. PATENT DOCUMENTS

| | | | |
|---|---|---|---|
| 2,044,480 | 6/1936 | Lord | 241/162 |
| 3,210,015 | 10/1965 | Tollemache | 241/56 |
| 3,873,034 | 3/1975 | Iwahori et al. | 241/55 |
| 4,690,338 | 9/1987 | Sayler et al. | 241/56 |
| 4,741,075 | 5/1988 | Taguchi et al. | 28/104 |
| 4,747,550 | 5/1988 | Jackering | 241/55 |
| 5,171,494 | 12/1992 | Nishibori | 264/48 |
| 5,323,971 | 6/1994 | Nishibori et al. | 241/152.2 X |
| 5,497,949 | 3/1996 | Sharer | 241/152.2 X |
| 5,544,821 | 8/1996 | Gupta et al. | 241/162 X |

*Primary Examiner*—John M. Husar
*Attorney, Agent, or Firm*—A & J

[57] ABSTRACT

The invention relates to an apparatus for recycling synthetic leather. The primary object of the invention is to provide an apparatus for recycling synthetic leather which can effectively separate out the resin from the synthetic leather.

1 Claim, 2 Drawing Sheets

APPARATUS FOR RECYCLING SYNTHETIC LEATHER

BACKGROUND OF THE INVENTION

1. Field of the Invention

This invention relates to an improved apparatus for recycling synthetic leather.

2. Description of the Prior Art

It has been found that synthetic leather is composed of a sheet of resin and a piece of cloth adhered to one side of the resin. Conventionally, the waste synthetic leather is simply thrown away, buried in the ground, or burned out. However, such three methods of disposing waste synthetic not only results in serious environmental problems, but also wasting the natural resources. Hence, it has been proposed using sulfuric acid to remove resin for the synthetic leather. Nevertheless, the sulfuric acid together with the resin must be drained off after use and this also brings about damages to the environment.

Therefore, it is an object of the present invention to provide an apparatus for recycling synthetic leather which may obviate and mitigate the above-mentioned drawbacks.

SUMMARY OF THE INVENTION

This invention relates to an improved apparatus for recycling synthetic leather.

It is the primary object of the present invention to provide an apparatus for recycling synthetic leather which can effectively separate resin from synthetic leather.

It is another object of the present invention to provide an apparatus for recycling synthetic leather which can prevent the environment from being polluted.

It is still another object of the present invention to provide an apparatus for recycling synthetic leather which is simple in construction.

It is still another object of the present invention to provide an apparatus for recycling synthetic leather which is low in cost.

It is a further object of the present invention to provide an apparatus for recycling synthetic leather which is facile to manufacture.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
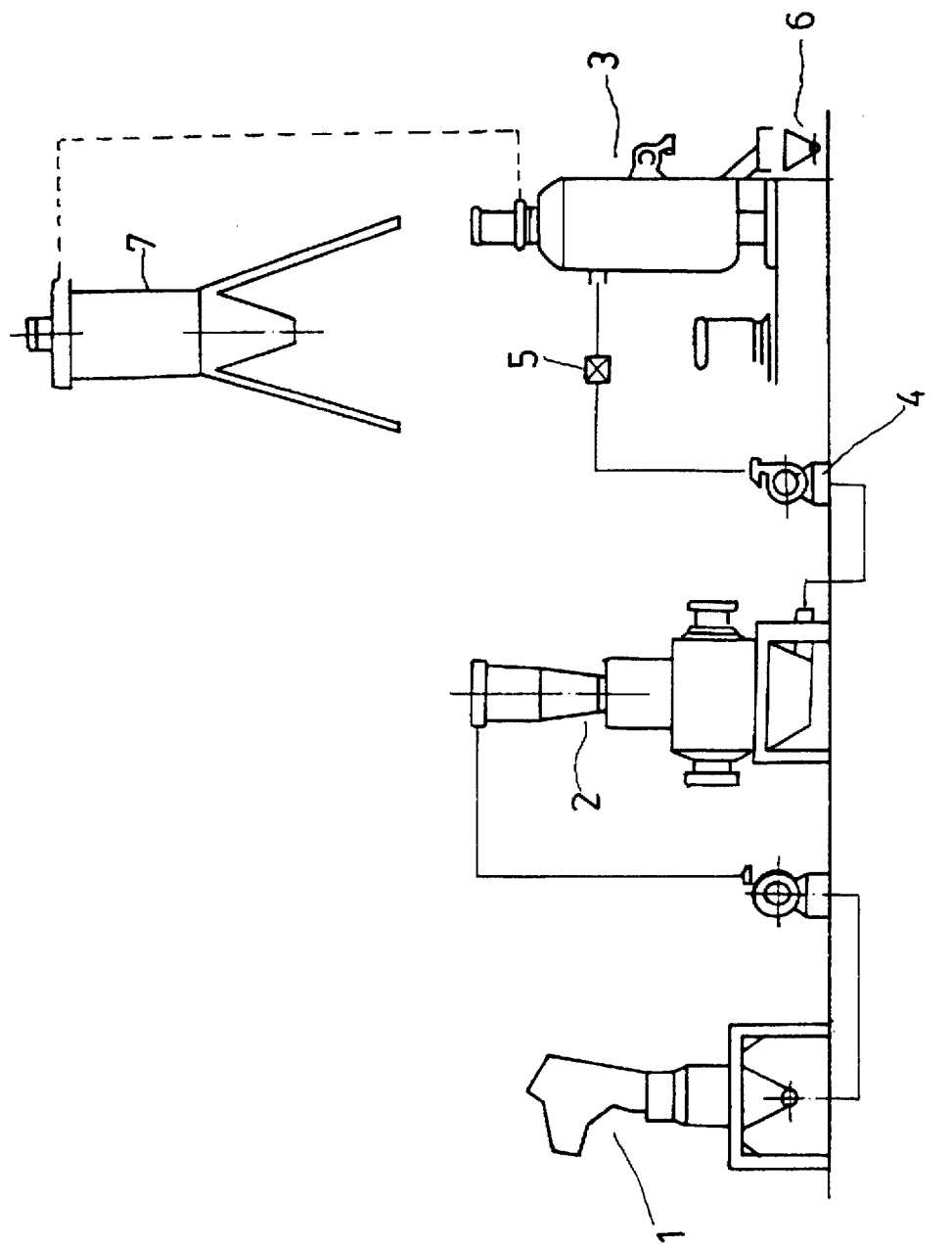
FIG. 1 illustrates an apparatus for recycling synthetic leather.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the apparatus for recycling synthetic leather according to the present invention mainly includes a coarse crushing device 1, a fine crushing device 2, and a separator 3. The conventional synthetic leather includes a sheet of resin and a piece of cloth adhered to one side of the resin. The coarse crushing device 1 and the fine crushing device 2 are used for breaking the synthetic leather into small pieces. However, it should be noted that an additional fine crushing device 2 and an additional separator 3 (not shown) may be arranged mounted in the apparatus for further crushing of the synthetic leather. The structure of the coarse crushing device 1 and the fine crushing device 2 may be of any conventional design well-known to those skilled in the art and are not considered a part of the invention.

A blower 4 is arranged between the fine crushing device 2 and the separator 3 for transmitting small pieces of synthetic to the separator 3. A static processor 5 is mounted between the separator 3 and the blower 4 for eliminating static produced during the crushing process thereby loosening the engagement between the resin and the cloth of the synthetic leather. The static processor 5 may be of any conventional design well-known to the art and is not considered a part of the invention.

Figure 2:
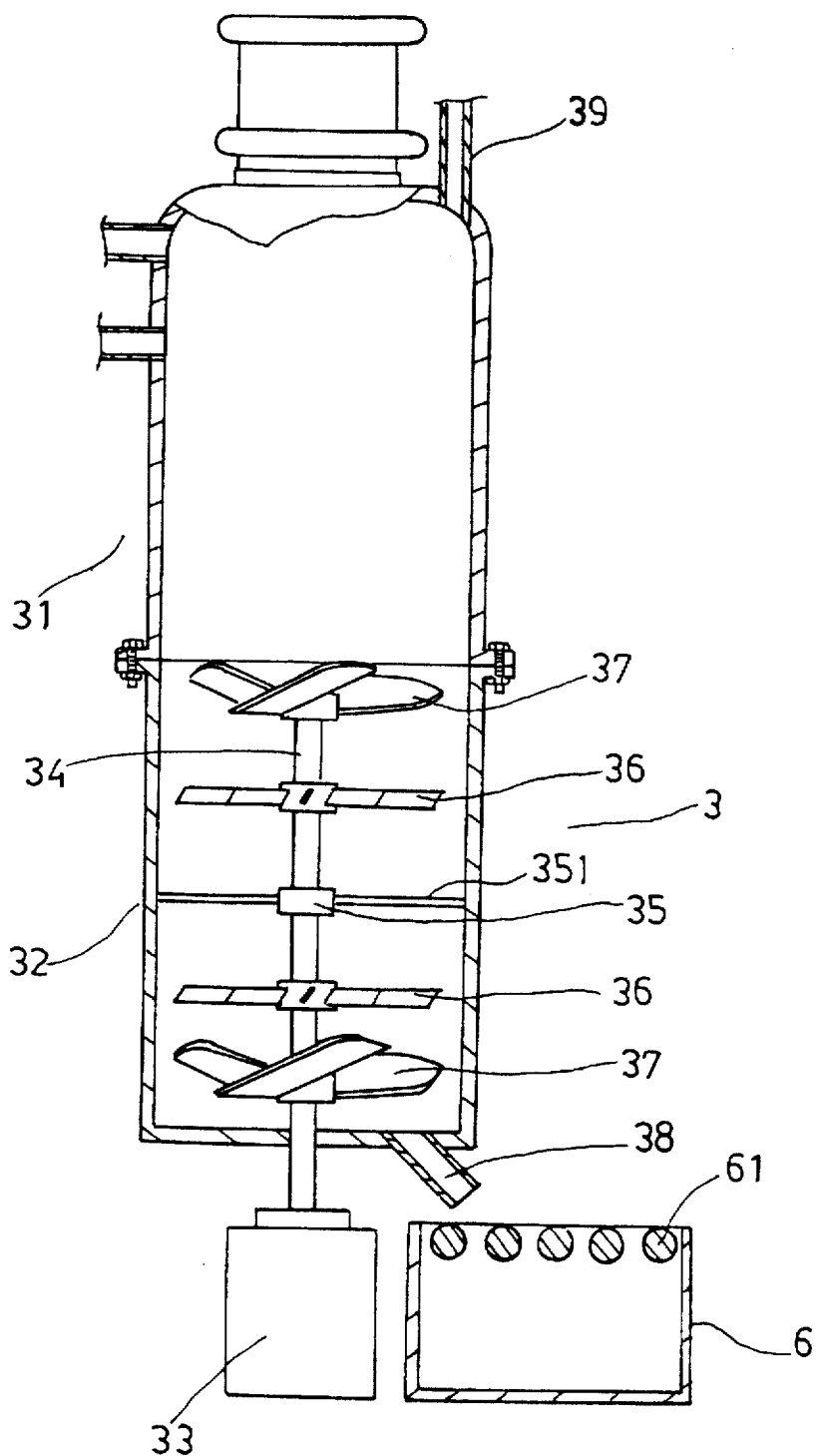
FIG. 2 is a sectional view of the separator.

Referring to FIG. 2, the separator 3 includes an upper housing 31 and a lower housing 32 which is fixedly connected to the lower end of the upper housing 31 by screws or the like. An electric motor 33 is mounted under the lower housing 32 and has an axle 34 extending upwardly into the lower housing 32. The intermediate portion of the axle 34 is enclosed with a collar 35 which is provided with a plurality of rods 351 connected with an inner wall of the lower housing 31 thereby keeping the axle 34 at a steady condition. The axle 34 is provided with a pair of stirrers 36 and a pair of impellers 37. The first one of the stirrers 36 is mounted above the collar 35, while the second of the stirrers 36 under the collar 35. One of the impellers 37 is arranged above the first stirrer 36, while the other under the second stirrer 36. The bottom of the lower housing 32 has an outlet pipe 38, under which there is a container 6 for collecting resin separated from the synthetic leather. The container is provided at the upper portion with a plurality of magnetic grille 61 made of steel. The top of the upper housing 31 has an outlet 39 which is connected to a collector 7 for collecting cloth separated from the synthetic leather.

When in use, the synthetic leather (not shown) is first broken by the coarse crushing device 1 and then further broken by the fine crushing device 2. Thereafter, the small pieces of synthetic leather is transmitted to the separator 3. As the synthetic leather passes through the static processor 5, the static produced during the crushing process will be eliminated thereby loosening the engagement between the resin and the cloth of the synthetic leather. Then, the resin and cloth are separated from the synthetic leather by the stirrers 36 within the separator 3. In the meantime, the cloth is blown upwardly through the outlet 39 of the separator 3 and collected by the collector 7, while the resin drops out of the separator 3 through the outlet 38 and collected by the container 6. Further, the magnetic grille 61 of the container 6 will remove any iron wires or the like from the resin. However, it should be noted that an additional separator 3 may be used for further separation of resin from the synthetic leather.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An apparatus for recycling synthetic leather comprising:

a coarse crushing device;

a fine crushing device connected with said coarse crushing device;

a separator including an upper housing and a lower housing fixedly connected with a lower end of said upper housing;

a motor arranged under said separator and having an axle extending upwardly into the lower housing of said separator;

a collar enclosing an intermediate portion of said axle within said lower housing, said collar being provided with a plurality of rods connected with an inner wall of said lower housing;

a first stirrer mounted above said collar within said lower housing;

a second stirrer mounted under said collar within said lower housing;

a first impeller mounted above said first stirrer;

a second impeller mounted under said second stirrer;

a blower connected with said fine crushing device at an end; and a static processor connected between said separator and said blower.

* * * * *